United States Patent [19]
Morcos et al.

[11] Patent Number: 6,167,404
[45] Date of Patent: Dec. 26, 2000

[54] MULTIMEDIA PLUG-IN USING DYNAMIC OBJECTS

[75] Inventors: Nader Morcos; Peter Barszczewski, both of Montreal; Marc-Andre DeCoste, Candiac; Daniel Desbois, Boucherville; Peter Ibrahim; Sophie Pronovost, both of Montreal; Nicolas Michaud, Outremont, all of Canada

[73] Assignee: AVID Technology, Inc., Tewksbury, Mass.

[21] Appl. No.: 08/963,737

[22] Filed: Nov. 4, 1997

Related U.S. Application Data

[60] Provisional application No. 60/054,331, Jul. 31, 1997.

[51] Int. Cl.[7] .................................................. G06F 17/30
[52] U.S. Cl. ........................ 707/102; 707/103; 707/104; 709/328; 345/326
[58] Field of Search .................................. 707/104, 102, 707/103; 709/328

[56] References Cited

U.S. PATENT DOCUMENTS

| | | | |
|---|---|---|---|
| 5,455,945 | 10/1995 | VanderDrift ................................. | 707/2 |
| 5,485,600 | 1/1996 | Joseph et al. ............................ | 395/500 |
| 5,706,456 | 1/1998 | Dupper et al. ........................... | 395/349 |
| 5,721,815 | 2/1998 | Ottesen et al. ........................... | 345/327 |
| 5,727,175 | 3/1998 | Malone et al. ........................... | 345/356 |
| 5,900,870 | 5/1999 | Malone et al. ........................... | 345/333 |

OTHER PUBLICATIONS

Zobkiw, Joe., "A Fragment of Your Imagination", p. 185–210 (1995) Addison—Wesley Publishing Company, Reading, MA.

Khan, Azam., "Impressionist–Internal Technical Documentation" (Conf.), ImageWare R+D Inc., Jul. 28, 1995. p. 1.

*Primary Examiner*—Hosain T. Alam
*Assistant Examiner*—Jean Bote Fleurantin

[57] ABSTRACT

The present invention concerns a multimedia presentation computer program that includes method and apparatus for sharing presentation functions between portions of the program by means of an interface that is implemented as one or more dynamically linked custom programs that perform one or more functions as the multimedia presentation computer program executes. A number of interface methods in the multimedia presentation computer program are declared and are implemented in the custom program The interface methods of the custom program are made accessible to the multimedia presentation computer program by means of an identifier. A host program within the multimedia presentation computer program communicates with the custom program by means of custom program parameters that at least in part define operation of the custom program. The custom program executes and thereby implements its one or more functions for use by the multimedia presentation computer program.

23 Claims, 4 Drawing Sheets

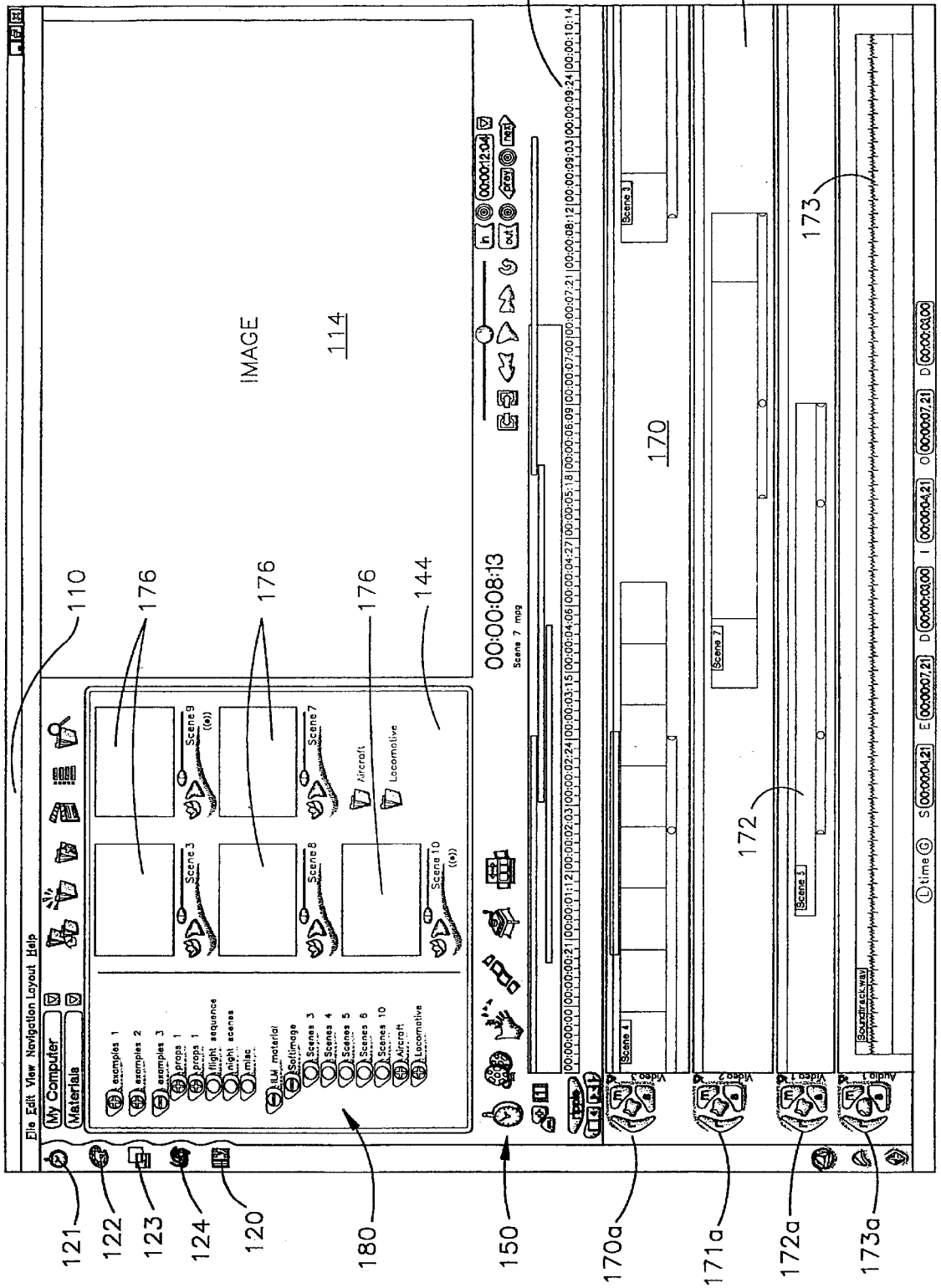

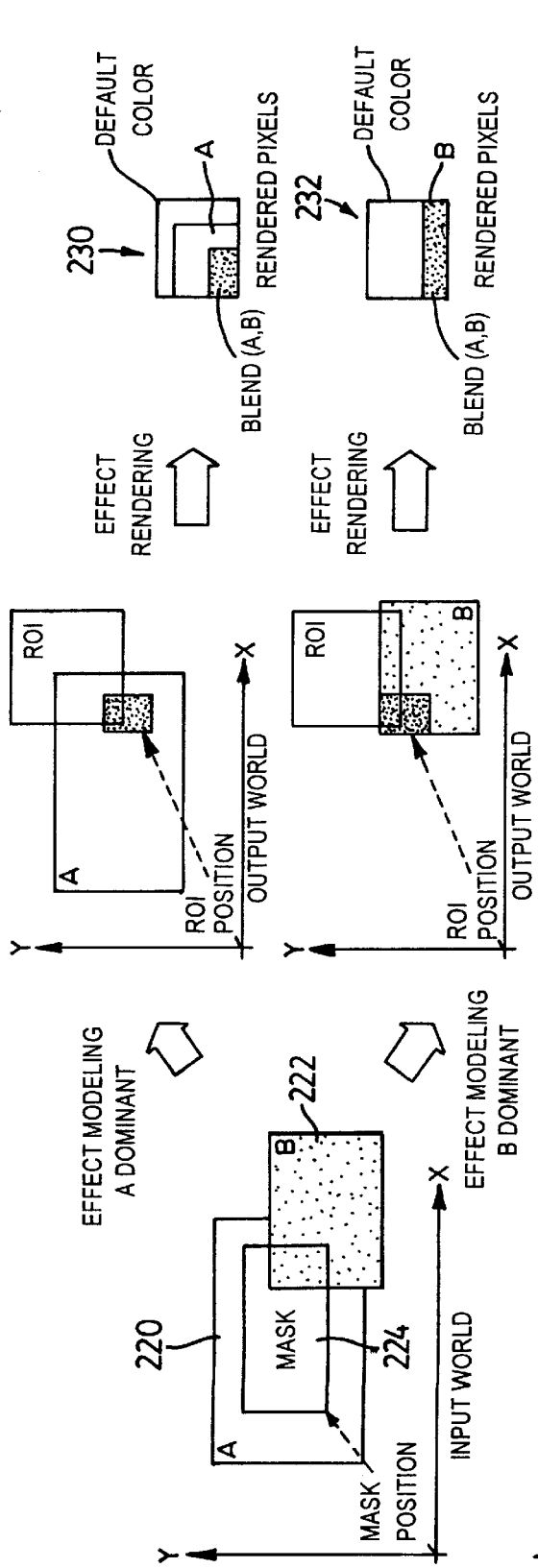
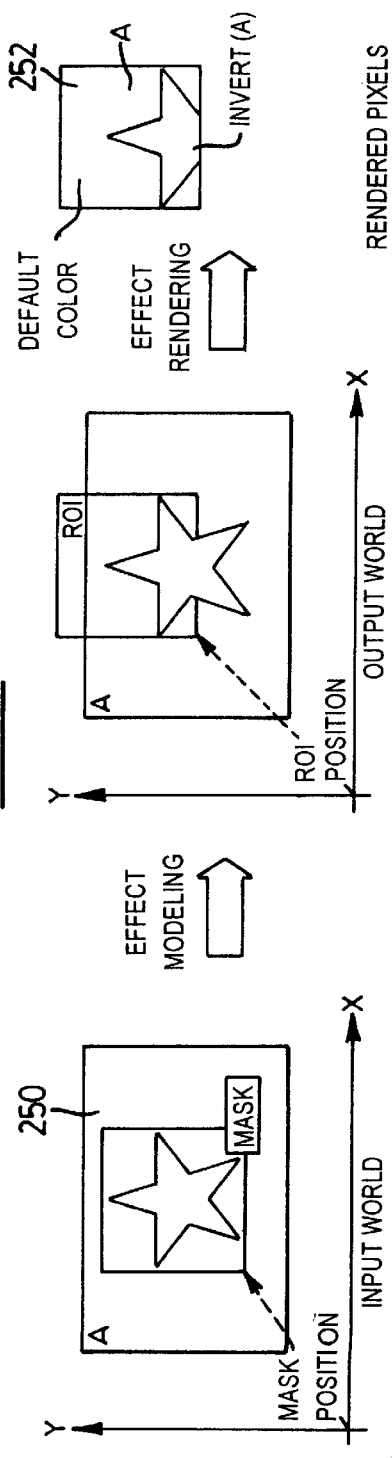
FIG. 4
FIG. 5

MULTIMEDIA PLUG-IN USING DYNAMIC OBJECTS

This application claims benefit of Provisional Appl. 60/054,331 filed Jul. 31, 1997.

FIELD OF THE INVENTION

The present invention concerns multimedia software that defines interfaces which allows use of third party multimedia effects as add-ons to a host multimedia software application program.

BACKGROUND ART

Personal computers and graphics workstations almost universally now run operating system software that include program interface functions that allow a user to define a desktop interface having a frame window that bounds a user work surface.

Three dimensional graphics rendering software has become a standard tool for use in composing, editing and displaying multimedia video presentations. This software is used in business presentations and videos as well as animated cartoons and commercial movies having thrilling special effects. In creating multimedia presentations, videos can be created from an analog source such as a videotape that is digitized, edited and then reconverted to analog tape form. The source for these presentations can also be digital data from a digital CD having images that are loaded into the computer memory and edited for subsequent presentation. As the capabilities of graphics rendering software have increased, the ability to create sophisticated multimedia presentations has been an incentive for a wide variety of users to become familiar with three dimensional graphics rendering software.

One commercially available software graphics rendering package is sold under the designation Photoshop. Purchasers of the Photoshop software may obtain addon software that adds to the capability of the software. These addons must adhere to an API standard. The addons are stored on the computer running Photoshop as a Dynamic Link Library (DLL) in a special folder reserved for these addons so that when Photoshop is launched this special folder is examined and the addons become available for use by the Photoshop user. The Photoshop software must include static 'hooks' for calling the DLL that are written, compiled, and linked into the Photoshop software. One prior art computer program that has been written for use with Photoshop accepts input image data, processes or filters that data, and outputs a resulting set of data having a different appearance than the input image data.

SUMMARY OF THE INVENTION

The present invention concerns a multimedia presentation computer program that includes method and apparatus for sharing presentation functions between portions of the program by means of an interface that is implemented as one or more dynamically linked custom programs that perform one or more functions as the multimedia presentation computer program executes. A number of interface methods in the multimedia presentation computer program are declared and are implemented in the custom program The interface methods of the custom program are made accessible to the multimedia presentation computer program by means of a unique identifier. A host program within the multimedia presentation computer program communicates with the custom program by means of custom program parameters that at least in part define operation of the custom program. The custom program executes and thereby implements its one or more functions for use by the multimedia presentation computer program.

The invention provides a means for implementing effects and other multimedia custom functions through use of COM object plug-ins that interface with the multimedia software but which can be customized in ways not envisioned by the designers of the multimedia software. The multimedia software is a software program that has been compiled and linked and is an executable computer program used for multimedia presentation creation and editing. In order to implement a plug-in as a COM object the object must implement a number of COM interfaces that are defined in a host program portion of the multimedia software. These interfaces can be implemented by a third party using his or her programming language of choice and then compiled and stored as a DLL. In order to expose the COM objects that implement custom effects or the like, the COM object must be registered. As an example, the invention can be used with hardware executing the Windows NT operating system software. This software sets up and maintains a registry. When the COM object plug-in is installed on the computer its set up program will register the COM object in the operating system registry.

The custom program is also referred to as a plug-in which is implemented as a COM object. The invention is most preferably used in conjunction with a commercially available multimedia computer program sold under the designation "SoftImage®|DS" by SoftImage Corporation of Montreal Canada. Practice of the invention allows full animation capabilities, resolution independence, an open user interface with subclassed windows controls. Audio editing, nonlinear editing, paint transition, time based effects are supported. The plug-ins apply to undo/redo mechanisms and can also apply to interactive tools for interactions with the user.

BRIEF DESCRIPTION OF THE DRAWINGS

FIG. 2 is a view of a display screen that depicts components for use with multimedia software for use with the present invention;

FIGS. 4 and 5 illustrate two graphics effects that are provided by means of a plug-in COM object constructed in accordance with the present invention.

BEST MODE FOR PRACTICING THE INVENTION

Figure 1:
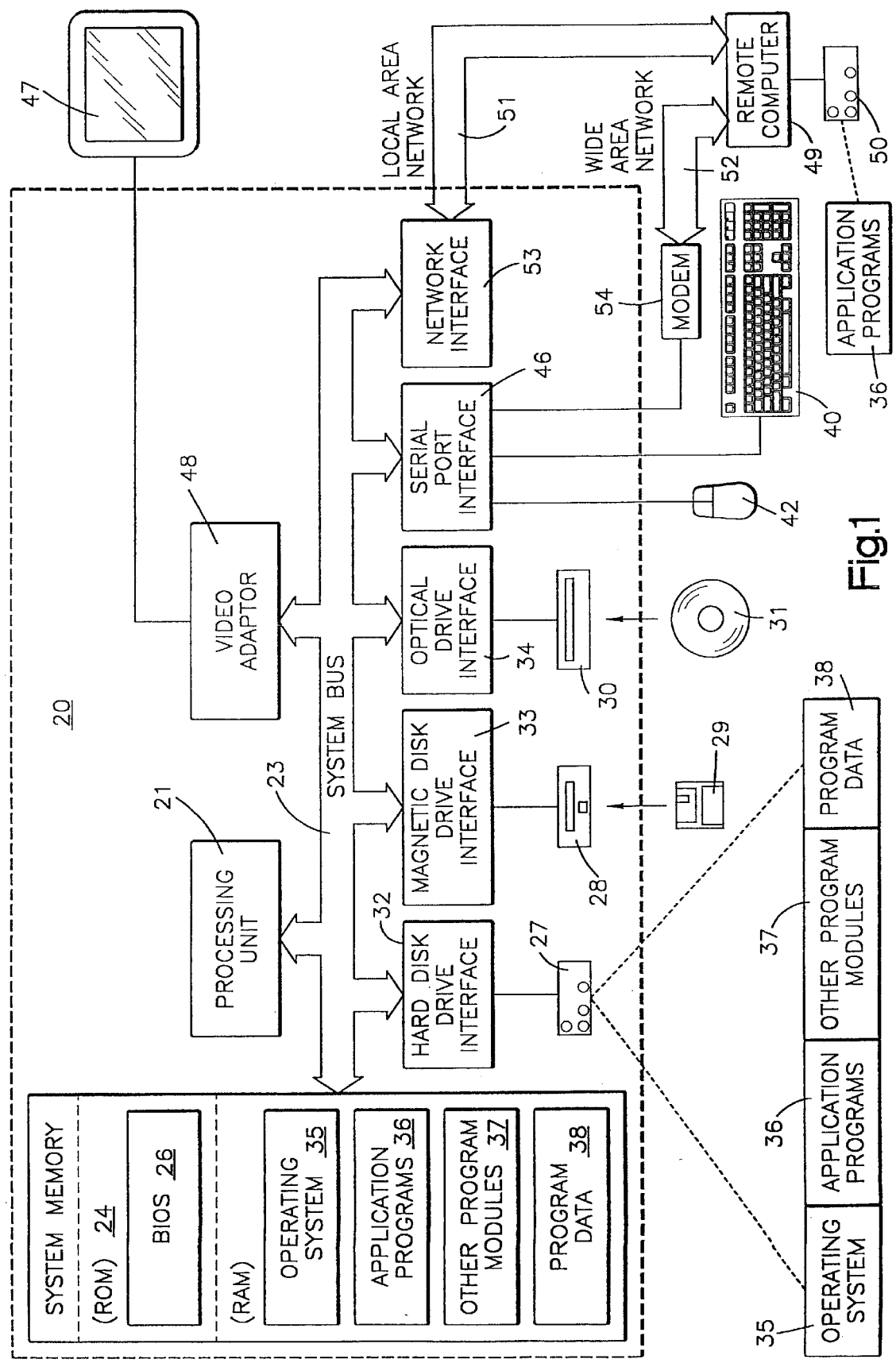
FIG. 1 is a schematic depiction of a computer system suitable for practice of the present invention.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 22 and random access memory (RAM) 25. A basic input/output system 26 (BIOS), containing the basic routines that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device.

It will be appreciated that the network connections shown are exemplary and other means of establishing a communications link between the computers may be used.

FIG. 2 illustrates a display window 110 presented by a multimedia computer program that implements features of the present invention. One example of such a multimedia computer program is 'Digital Studio' commercially available from SoftImage of Montreal, Canada. The display window 110 fills an entire viewing area of the computer monitor and defines a user work area for the user to perform multimedia editing and composing tasks. A window 114 attached to the frame window 110 displays graphic images on a portion of the user work surface bounded by the frame window 110. One or more additional child windows attached to the frame window depict tools that are used in performing the functions of the multimedia computer program.

Located to one side of the frame window is a set of icons that control which task of a possible number of tasks the user can select via the user interface. By selecting on or clicking with a cursor control a different suite of controls is presented. In accordance with a presently preferred embodiment of the present invention there are five different icons 120–124 that the user can actuate and which in combination form a task bar. A first media management icon 120 allows the user to capture source material and output results to a storage media. A second editing icon 121 is for use in editing audio and video clips that have been retrieved from the storage media or from digital storage. A third graphics icon 122 is used to modify images using the graphics rendering tools such as adding paintbrush strokes and text through use of a drawing or titling tool. A compositing icon 123 is used to compose graphic images from multiple sources either stored in digital or in analog form and converted to digital form. Finally, the user interface includes an audio icon 124 that allows editing and playback of audio clips that can be co-ordinated with multi-media visual images to produce a final multi-media product for producing both sound and video.

To the right of the task bar region of FIG. 2 is a console region 144 that includes a number of different user controls that vary depending upon the software suite the user chooses by clicking on a selected one of the task icons 120–124. A console toolbar region 150 allows the user to access the various toolsets available in a given suite. The suite depicted in FIG. 2 is the editing suite where the user can perform editing tasks. The user can view multiple video clips or tracks acquired from one or more video tapes within a region of the screen located directly beneath the console toolbar. In the editing mode the user may then apply transitions and effects to the images in the clips and view the results in the image region 114.

FIG. 2 illustrates multiple media tracks 170–173 that extend across the width of the screen beneath a timeline 174 that provides an indication in seconds of relative positioning of the tracks. The top three tracks illustrate multiple graphic images and the last track 173 is a graphical depiction of a sound file. On a right-hand side of the tracks 170–173 four track controls 170a, 171a, 172a, 173a allow the user to control the behavior of the tracks 170–173.

Located within the console region 144 are a number of images 176 that are loaded from disk. A browser 180 is located to the left of the images 176. The browser facilitates file management tasks such as moving, copying and renaming clips, as well as deleting clips and the media files they represent.

During installation of the multimedia software, a number of predefined settings are loaded onto the hard disk 27. These so called presets allow the user to pick and choose from a variety of possible predefined effects that can be used while creating and editing images and video presentations. One example of such a predefined effect might be an effect that transforms an image from its original state into an image having an impressionistic appearance. The multimedia software is written to allow use of so called plug-ins that are software modules or objects that can provide functionality to the multimedia software.

The plug-in can be written at the time the multimedia software is created and supplied by the multimedia software vendor, or it can be created as a third party add-on or plug-in which extends the functionality of the multimedia software. The ability of the third party developer to add functionality to the multimedia software without the writers of the multimedia software making special provisions for use of the third party plug-in is a distinct advantage practice of the invention has over the prior art. Once a plug-in is registered, it becomes available for use by the multimedia software to add unique functionality not available to the standalone version of the multimedia software. The present description uses the term add-on or plug-in interchangeably to describe the software for implementing this flexibility.

Families of Effects

A multimedia computer program may produce an effect that operates on an input file containing a multimedia clip that includes an image and audio track and produces an output multimedia file that has been altered due to application of a desired effect on that file. The multimedia plug-ins are organized into families or groups of effects. Each family is uniquely identified by a GUID (Globally Unique Identifier). Families are registered in a registry so that families can be added afterward. Objects can be registered as part of one or more families. Objects can also specify a default or preferred family in the registry.

Plug-in objects that belong to the same family are interchangeable so that they can be substituted for each other. One example of a family of effects would be effects that receive the same number of inputs (one, possibly zero or perhaps a plurality) for processing and which produce a single output that is returned to the multimedia program for display and storage on disk. A typical plug-in constructed in accordance with the present invention operates on an image or an audio data and returns an image or an audio data. To process an entire track of images/audio therefore, the effect of the plug-in must be applied successively to multiple sets of image or audio data. The example given of the number of inputs and outputs defining a family is only illustrative. A family could be defined based on other similarities of the effect. The characterizing feature of the family is that one effect in the family can be exchanged with another effect and used to modify the multimedia content of a set of data.

A plug-in constructed in accordance with the invention can take as an input a single input image and produce a single output image that has been modified in accordance with the changes defined by the plug-in. An example of one family of effects would be a single input image that is filtered to produce a single output image where the pixel content of the output image has been consistently modified based on the characteristics of the filter. This type of effect is used, for example, in non-linear editing of an image track or applying paint image effects in the context of paint brush strokes applied to a computer screen canvas.

Transition effects are effects that are applied to 2 inputs and produce one output. In this type of effect two images (such as the images in the console region of FIG. 2 for example) are combined or blended into one. A background generator is an example of an effect where there is no input but there is an output. Time based effects may use multiple inputs and only a single output. To produce a given image it may be necessary for the effect to use or consume parts of multiple input images and produce a single output. An audio filter is an effect where there is one audio input and a single audio output is produced.

The present invention provides a means for implementing effects and other multimedia custom functions through use of COM object plug-ins that interface with the multimedia software but can be customized in ways not envisioned by the designers of that software. In the following description the term multimedia software will refer to a software program that has been compiled and linked and is an executable computer program used for multimedia presentation creation and editing.

In order to implement a plug-in as a COM object the object must implement a number of COM interfaces that are defined in a host program portion of the multimedia software. These interfaces are implemented by a third party using his or her programming language of choice and then compiled and stored as a DLL. A default implementation is provided by the multimedia software so that in some instances only minimal software modification by the third party implementer is required.

In order to expose the COM objects that implement custom effects or the like, the COM object must be registered. In accordance with a preferred embodiment of the invention the multimedia software runs on hardware executing the Windows NT operating system software. This software sets up and maintains a registry. When the COM object plug-in is installed on the computer, its setup program will register the COM object in the operating system registry.

The multimedia software also has an entry in the registry and there are a number of helper functions that come with the multimedia software to allow the implementer of the COM object plug-in to write a unique identifier for the plug-in. This unique identifier is a 128 bit unsigned integer and is referred to as a ClassID. When the plug-in is installed, the plug-in is classified with other similar plug-ins as a family in the Windows registry. All such similar plug-ins are then identified to the user as pre-sets that can be loaded. When the pre-set is loaded, the ClassID for the plug-in is read to enable the multimedia software to uniquely identify that plug-in.

When the multimedia software needs to access a COM object plug-in, it calls a COM object function known as CoCreateInstance with a parameter of the ClassID of the COM object the multimedia software wants to create. This will load the DLL for that object and call a class factory function for the COM object. A class factory must exist for each plug-in COM object in order to create instances of the object.

Figure 3B:
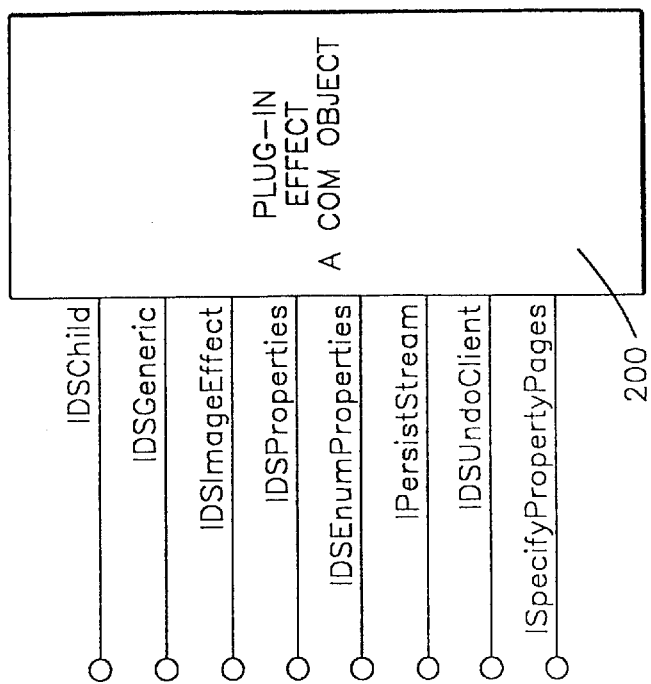
FIGS. 3A–3C are depictions of an interface between a host, a plug-in and a user interface that are implemented as COM objects.
Figure 3C:
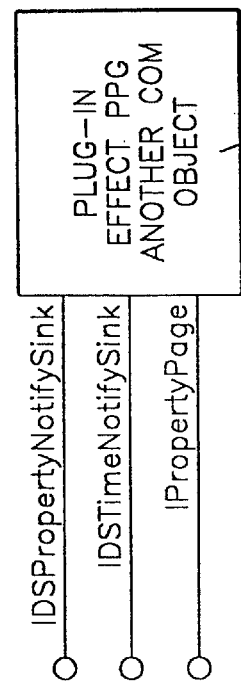
Figure 3A:
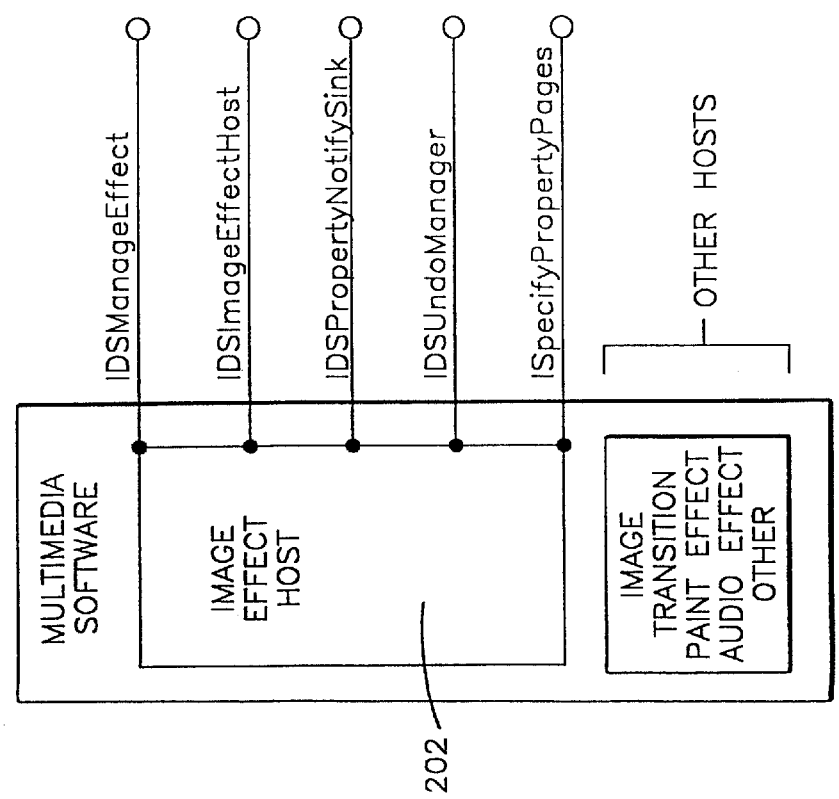

FIG. 3 is a diagram of a typical COM object 200 whose functionality is accessed through an image effect host portion 202 of the multimedia software. The host 202 is also a COM object and is responsible for implementing a number of interfaces listed in FIG. 3. The plug-in COM object 200 has its own set of interfaces that must be implemented or overridden. These interface functions are declared in the multimedia software but at the time the multimedia software is compiled and linked their implementation need not exist.

Note, as an aid to third party developers, however, libraries are provided that implement some of these interfaces. These can be used as is by the third party developer or overridden if needed.

The IDSGeneric interface allows for status validation of the COM object when it is instantiated and destroyed. The IDSEnumProperties is a property enumerator. The IDSUndoClient allows the host COM object to undo a function that was performed by the COM object. In the context of a filter, for example the undo facility restores the original image by removing the filter effect. The Undo function returns the state of the plug-in to its prior state before causing the plug-in to execute. The plug-in changes from state A to B and the host asks the plug-in to execute with an input C to provide an output image D. The undo function can return the plug-in to state A. The host can then ask the plug-in to execute on input C to produce an output image E.

The plug-in object 200 implements the IDSUndoClient interface. An Undo Manager service object with the multimedia application implements the IDSUndoManager interface. With plug-ins built using the multimedia base classes, whenever a property value is changed because of a change implemented via the user interface, the base classes detect this property value change and create a DSUNDOEVENT struct and fill that structure with the necessary information to perform an undo action and register the undo action with the Undo Manager service. The plug-in communicates with the Undo Manager service object through the IDSUndoManager interface. The Undo Manager service object communicates with the plug-in through the the IDSUndoClient interface.

When the undo operation is more sophisticated than simply remembering the property value prior to the value change, it is up to the plug-in itself to overload the default undo mechanism implemented by the multimedia base classes. All the necessary interfaces and overloadable methods are available for the third party developer to implement in the plug-in. There are overloadable methods to detect the user interface changes and to perform the undo operation within the plug-in.

In an instance where the plug-in objects directly implement the interfaces, i.e. without using the multimedia provided base classes, the developer must implement the entire undo mechanism by writing the interface implementations for the plug-in. For a complex undo operation, the third party developer must implement the undo completely. Third party developers can perform this by overloading some base class methods (e.g. method manipulating data changes coming from the user interface) or by implementing their own data handling through the interfaces.

Once the Undo client event is created, it is then given to the Undo service manager through an IDSUndoManager interface. The IDSUndoManager maintains all undo events in a list of such events and makes sure a proper client (plug-in object) is given the proper data when an undo command is requested via the user interface. The plug-in uses the data passed to it by the IDSUndoManager as it executes its undo functions for reverting back to a previous state. As stated, the multimedia base classes can handle simple cases. The data structure for the data handled by the IDSUndoManager can be extended by the third party software to add event specific fields at the end of the common structure fields already defined in the multimedia software.

The ISpecifyPropertyPages interface (FIG. 3B) is an OLE interface that COM objects use to specify associated property pages that are used with the COM object as a user interface. The interface IPersistStream is an interface that the COM object uses to load and save properties to and from a disk storage. This interface allows a status or state of the COM object to be saved and reloaded. For example, when the plug-in COM object is installed on a computer system, the setup program will instantiate the plug-in, request the IDSGeneric interface to execute Init, request the IPersistStream interface to execute Save, hence generating a "factory" preset for the plug-in. At run time, a user can modify some properties of the plug-in and save a new preset through interaction with user interface elements of the multimedia software, again using the IPersistStream interface.

Two important interfaces are IDSImageEffect and IDSProperties. (If the effect relates to audio effects the IDSImageEffect will be replaced by an interface called IDSAudioFilter or the like.) The interface IDSImageEffect is the interface that, for example, for a filter effect of one input and one output will receive an image from the multimedia application and modify the input image by means of the image effect and return the modified output image back to the multimedia application. The interface IDSProperties allows the multimedia application (or any other component, like the UI COM object 210 of FIG. 3C for example) to access the properties of the plug-in.

The IDSImageEffect interface includes a number of function calls that are required in order for the input and output of the effect to be communicated back and forth with its associated host. A number of the important functions and a brief synopsis of the function they perform are enumerated below:

1. SetDefaults: This function assigns default values to the properties of the effect.
2. Setup: The effect allocates needed resources prior to execution.
3. Cleanup: The effect frees resources after execution.
4. SetInput: The host sets up and transmits an input image to the effect.
5. SetOutput: The host sets the output image for the effect to write to.
6. SetChannelMask: The host sets the processing mode.
7. SetPixelMask: The host sets the mask coordinates and pixels of a portion of an image that acts as a mask.
8. SetExecuteCJontext: The host provides a cookie contextual to the current execution (when the Execute( ) method is involved) to be given back to the host when the plug-in requests more data information from the host while the invocation of the execute( ) method.
9. Verify: The effect verifies that the properties are valid and that it can execute.
10. Execute: When called, the effect performs its task on the input image and writes to the output image.

Once a plug-in effect has been registered and created, it is accessible from the host software to perform the functions of the Execute method. To prepare the plug-in for execution, however, the host first calls the SetInput and SetOutput functions. These functions provide a region of memory for placement of an input image by the host and also provide a region of memory for the plug-in to place a return or resulting image. The host will next call the Setup and Verify methods to prepare the plug-in for execution. The Setup method will cause the plug-in to allocate any resources needed during its execution and the Verify method allows the plug-in to indicate to the host if there are any conditions known to the plug-in that would prevent the plug-in from properly executing. Successful completion of the Verify function will allow the host to call the Execute function which typically will fill the region of memory designated in the SetOutput function with a resultant image. Once the execute function has been completed the plug in will perform its Cleanup function to free any of the resources allocated during Setup.

The host makes itself available to the plug-in by means of a SetEffectHost function that is part of the host interface IDSImageEffect. When the host executes the SetEffectHost command the plug-in obtains the IDSImageEffectHost interface of the host. This interface exposes methods that allow the plug-in to get more information. One function, named GetDataAtTime allows the plug-in to get data at a specified time. Time in this instance means time based on a timeline 174 seen in the FIG. 2 depiction of the screen. This allows the effect to update itself by obtaining data it needs without the host having to specifically make this data available to the plug-in. A second function supported by the host is a IsCanceled function. This function returns a specified return value if the plug-in effect has been canceled by the user. Another method, GetNbInputPorts( ), allows the plug-in to know how much input data is availiable, thus allowing the plug-in to get data through the GetDataAtTime( ) functioin for a specific input port.

User Interface

Many COM object plug-ins will require a means of allowing the user to interact with the plug-in to modify certain properties of the plug-in. If, for example, the plug-in is to apply a brush stroke over a region of interest, then the user may be prompted to identify the RGB components of the brush stroke by means of a dialog box or the like. As seen in FIG. 3C the plug-in has associated it a so-called property page that is a separate COM object 210 that is registered and implements the three interfaces listed in FIG. 3.

The multimedia software provides a frame window that bounds the property page and provides an interface for the user to interact with properties of the plug-in 200. When a property page is displayed it automatically inherits the same look as the multimedia software and provide access to properties of the COM object plug-in 200.

The property page supports three interfaces, IPropertyPage, IDSPropertyNotifySink, and IDSTimeNotifySink. Property change notification will be sent to the property page through the IDSPropertyNotifySink. As an example, if the COM object 200 changes state, it will notify both the host 202 and the user interface object 210 and the user interface object may respond in an appropriate manner. The IDSTimeNotifySink interface informs the user interface object regarding time changes on the timeline 174 that have been performed by the user. These time changes may cause the animated properties of the object to change and may require a response from the host, the plug-in and the UI object 210.

The base classes provided with the multimedia software provide a unique way for the property page and the plug-in to communicate regarding the properties of the plug-in. Other mechanisms can be used by third party written software so long as the interfaces defined in the multimedia software are implemented.

The provided base classes maintain a property map which is a list of the plug-ins characteristics. All properties in the property map are identified by globally unique identifiers, referred to as GUIDs. Like the ClassId used to register the plug-in, the GUID is a 128 bit unsigned integer that is assigned in an essentially random basis by a Visual C utility: guigen.exe. When the third party developer writes the plug-in the GUIDs for the plug-in that describe its properties are assigned. The plug-in PPG (user interface object) maintains a control map using the same GUIDs. This makes the link between the two objects so that when the user makes a change to a property via the user interface object 210 that change is implemented in the plug-in 200.

The presently preferred implementation of the multimedia software provides some dynamic link libraries (DLLs) which provide property pages that can be used by third party developers. These property pages come with predefined GUIDs so that when a plug-in is built that uses one of the predefined property pages, the developer is constrained to use the predefined GUIDs.

When writing the property page and the plug-in the source code must include definitions of the properties to be connected. The following MACRO establishes a properties map of a sample plug-in that defines the properties of the plug-in in terms of GUIDs.

```
// Properties map
BEGIN_DSPROPERTIES_MAP( CImgEffect, CDSImageEffect, g_hInstance )
    DSPROPERTIES_MAP_NO_ARGUMENT( CImgEffect, m_dDarkness, DSVT_R8 ,
GUID_IGFX_DARKNESS, IDS_DARKNESS, IDS_DARKNESS_LONGNAME,
DSPROPERTY_CAP_PERSISTABLE | DSPROPERTY_CAP_ANIMATABLE)
    DSPROPERTIES_MAP_NO_ARGUMENT( CImgEffect, m_fMono ,
DSVT_BOOL, GUID_IGFX_MONO ,IDS_MONO ,IDS_MONO_LONGNAME ,
DSPROPERTY_CAP_PERSISTABLE | DSPROPERTY_CAP_DEFAULT)
      DSPROPERTIES_MAP_NO_ARGUMENT( CImgEffect, m_bstrName,
DSVT_BSTR, GUID_IGFX_NAME ,IDS_NAME ,IDS_NAME_LONGNAME ,
DSPROPERTY_CAP_PERSISTABLE)
      // Channel masking
    DSPROPERTIES_MAP_NO_ARGUMENT( CImgEffect, m_lRed ,DSVT_I4 ,
GUID_CMASK_RED ,IDS_RMASK ,IDS_RMASK_LONGNAME ,
DSPROPERTY_CAP_PERSISTABLE)
    DSPROPERTIES_MAP_NO_ARGUMENT( CImgEffect, m_lGreen ,DSVT_I4 ,
GUID_CMASK_GREEN ,IDS_GMASK ,IDS_GMASK_LONGNAME ,
DSPROPERTY_CAP_PERSISTABLE)
    DSPROPERTIES_MAP_NO_ARGUMENT( CImgEffect, m_lBlue ,DSVT_I4 ,
GUID_CMASK_BLUE ,IDS_BMASK ,IDS_BMASK_LONGNAME ,
DSPROPERTY_CAP_PERSISTABLE)
    DSPROPERTIES_MAP_NO_ARGUMENT( CImgEffect, m_lAlpha ,DSVT_I4 ,
GUID_CMASK_ALPHA ,IDS_AMASK ,IDS_AMASK_LONGNAME ,
```

-continued

```
DSPROPERTY_CAP_PERSISTABLE)
END_DSPROPERTIES_MAP()
```

A similar macro defines the properties in a control map that is part of the UI object 210. The connection between the property page and the control map is implemented by the base classes, through the IDSProperties interface.

Image Model

An interface defined (and implemented by) the multimedia software called IDSImage sets up a model for images that are inputs to the various effects that can be implemented as plug-ins. The image is a digital image made up of pixels. The pixels are uniformly spaced on a rectangular grid that need not be square. Pixel values for the image are stored in a continuous array in memory. The image resolution is defined as the coarseness of the image. The resolution and the size of an image define how many pixels make up the image.

Every image needs size and position attributes which are defined in terms of world coordinates. Image processing effects work with a limited number of image formats. Image data can be accessed in a number of ways including accessing individual pixels or arrays of pixels. The IDSImage interface supports the functions of CopyRegion( ), PasteRegion( ), FillRegion( ), GetPixel( ), SetPixel( ), and Allocate( ) which allocates a region of memory for an image.

A plug-in effect transforms an input to an output. All image processing effects are fully defined by the following input information: input images, pixel mask (when appropriate), region of interest, the operation to be performed and channel mask (when appropriate). The purpose of a pixel mask is to process only a region of the input image. A pixel mask is represented by a single-channel image or a single channel of a multi-channel image. Using the mask image, the user can specify a non-rectangular anti-aliased mask that defines what pixels of the input will be affected by the plug-in effect. The coordinates of the mask are in a world coordinate system.

A region of interest can be thought of as a 'rendering box' or a viewport. Once the effect is fully defined by the input images, options and mask a region of interest defines the output as a portion of the input. The region of interest coordinates are in the world coordinate system. The channel mask permits the user to specify individual channels on which processing should be done. As an example the user can invert the pixels for only the alpha channel of an RGBA image.

Consider the example of two input images 220, 222 depicted in FIG. 4. A plug-in effect blends these two images into an output. The input images are defined as inputs in terms of their world co-ordinates and their size. A pixel mask 224 specifies the input world region to process and in this region a blend effect is applied to a region of overlap of the two images. The resultant region of interest is the output from the effect. Two different outputs 230, 232 are depicted in FIG. 4. A resultant output in FIG. 4 depends on which of the images dominates in non-blended regions of the output.

Also, consider the example of FIG. 5. In this example a single input 250 is received by a plug-in and is filtered to provide an output 252 that is a reverse video of the input. This effect can be thought of as a negative producing effect since the image is reversed.

The multimedia software provides the plug-in effect with an interface pointer on a resolution independent manager. Using this interface pointer a plug-in can determine computer Raster (pixel) coordinates from information given to the plug-in by the hosts in real-world coordinate, and then apply intersections on several regions to get the final region of interest.

The following is one implementation of a co-ordinate transformation.

```
// Get the origin coordinates (in real-world units) of the input image
// Get the size (in real-world units) of the input image
double l_dImgPosX, l_dImgPosY;
double l_dImgSizeX, l_dImgSizeY;
if(NULL != m_pInputImg)
{
    m_pInputImg->GetPos( &l_dImgPosX, &l_dImgPosY);
    m_pInputImg->GetSize( &l_dImgSizeX, &l_dImgSizeY);
}
else // Source effect
{
    m_pOutputImg->GetPos( &l_dImgPosX, &l_dImgPosY);
    m_pOutputImg->GetSize( &l_dImgSizeX, &l_dImgSizeY);
}
// Convert the image bounding box to Raster coordinates
l_hr = m_priConv->W2Rregion(l_dImgPosX, l_dImgPoxY,
                                  l_dImgSizeX, l_dImgSizeY,
                                  &m_lInputImgX, &m_lInputImgY,
                                  &m_lInputImgW, &m_lInputImgH);
assert(SUCCEEDED(l_hr);
// Convert the ROI to Raster coordinates
Long l_lInRoiW, l_LinRoiH;
l_hr = m_priConv->W2RRegion(m_dRoiX, m_dRoiY, m_dRoiW, m_dRoiH,
                              &m_lRoiX, &m_lRoiY, &l_lInRoiW, &l_lInRoiH);
assert(SUCCEEDED(l_hr));
// Convert the Output offset to Raster coordinates
```

-continued

```
LONG l__lOutRoiW, l__lOutRoiH;
1__hr = m__priConv->W2Rregion(m__dOutputOffsetX, m__dOutputOffsetY,
                              m__dRoiW, m__dRoiH,
                              &m__lOutputOffsetX, &m__lOutputOffsetY,
                              &l__lOutRoiW, &l__lOutRoiH);
assert(SUCCEEDED(1__hr));
// Convert the mask to raster coordinates
1__hr = m__priConv->W2Rregion(m__dMaxkX, m__dMaskY, m__dMaskW, m__dMaskH,
                              &m__lMaskX, &m__lMaskY, &m__lMaskW, &m__lMaskH);
assert(SUCCEEDED(1__hr));
//Intersect
```

Another feature of the present invention is the ability to animate a plug-in effect. Consider the example of a filter that is applied to successive images to and produces a fade to black of those images. Consider a first image D0 which includes a set of pixels. The plug-in implements its fade property by filtering the image D1 with a filter property P0 at time t0 to produce an output image D0'. At a later time t5 (five seconds later for example in the image clip) the fade to black plug-in receives a different input image D5 for application of the fade to black effect. But at time t5, through the plug-in's animation ability, has a new property value P5 for the filter property P. This filter is applied by the plug-in to the image D5 to produce an output D5'. By means of a property page user interface, the user can adjust the transition from the property value P0 to the property value P5. In short, the property P is animated to include many values that change with time.

While the present invention has been described with a degree of particularity, the invention is intended to include all modifications and alterations from the disclosed design falling within the spirit or scope of the appended claims.

What is claimed is:

1. In a multimedia presentation computer program, a method for adding functionality to the computer program by means of an interface that includes a dynamically-linked custom program that performs one or more functions of the multimedia presentation computer program, said method comprising the steps of:

a) declaring a number of interface methods in the multimedia presentation computer program which are implemented by a custom program;

b) making the interface methods of the custom program accessible to the multimedia presentation computer program by means of an identifier;

c) defining a host program within the multimedia presentation computer program for communicating with the custom program by means of custom program parameters that at least in part define operation of the custom program;

d) providing the custom program with a multimedia input from the multimedia presentation computer program; and e) causing the custom program to implement its one or more functions on the multimedia input for providing the multimedia presentation computer program with the implemented one or more functions.

2. The method of claim 1 wherein the step of making the custom program accessible is accomplished by means of a globally unique identifier for the custom program that is made up of a sequence of numbers chosen large enough to generally avoid duplication with identifiers used to identify other custom programs.

3. The method of claim 2 wherein the custom program is implemented with two dynamically linked objects, one of said dynamically linked objects for implementing the one or more functions and a second for implementing a user interface.

4. The method of claim 3 wherein the two dynamically linked objects share properties that are designated by globally unique identifiers.

5. The method of claim 1 wherein the multimedia presentation computer program registers multiple dynamically linked objects that define families of multimedia effects.

6. The method of claim 5 wherein the custom program provides the implemented functions as one or more outputs to the multimedia presentation computer program, and the one or more outputs are graphic images that are transformations of at least one input image.

7. The method of claim 6 wherein the one or more outputs are graphic images that are animations of an input graphic image.

8. The method of claim 1 wherein the multimedia program implements a persistance method to allow a state of the dynamically linked object to be saved and reloaded from a storage medium.

9. The method of claim 1 where the presentation function performed by the dynamically linked object can be undone by communicating with the multimedia presentation software.

10. A stored program for use with a multimedia presentation computer program executing in a computing operating environment that maintains a registry, said multimedia program providing a plurality of presentation functions, said program comprising:

a) one or more dynamically-linked custom programs, each said custom program receiving a multimedia input from the multimedia presentation computer program, implementing one or more functions on the respective multimedia input, and providing the multimedia presentation computer program with the implemented one or more functions;

b) host software that forms part of the multimedia presentation computer program and provides an interface for communicating with one or more dynamically-linked computer programs; and c) helper functions for registering the one or more dynamically-linked custom programs in the operating system registry to allow the host program interface to communicate with the dynamically-linked custom programs.

11. The stored program of claim 10 wherein the step of making the custom program accessible is accomplished by means of a globally unique identifier for the custom program that is made up of a sequence of numbers chosen large enough to generally avoid duplication with identifiers used to identify other custom programs.

12. The stored program of claim 10 wherein each presentation function is implemented with two dynamically linked objects, one of said dynamically linked objects for implementing the functionality of the object and a second dynamically linked object for implementing a user interface that allows a user to control the presentation functions.

13. The stored program of claim 12 wherein the two dynamically linked objects share properties that are communicated by globally unique identifiers.

14. The stored program of claim 10 wherein the multimedia presentation computer program registers multiple dynamically linked objects that define families of multimedia effects.

15. The stored program of claim 14 wherein the custom program provides the implemented functions as one or more outputs to the multimedia presentation computer program, and the one or more outputs are graphic images that are transformations of at least one input image.

16. In a multimedia presentation program, a method for implementing multimedia presentation functions by means of a COM object interface that communicates with one or more dynamically-linked COM objects, said method comprising the steps of:
    a) declaring a number of COM object interface methods in the multimedia presentation computer program;
    b) implementing the interface methods to define the functionality of the one or more dynamically-linked COM objects;
    c) making the interface methods to the COM objects accessible to the multimedia presentation computer program by means of a unique identifier;
    d) defining a host program within the multimedia presentation computer program for communicating with the COM object by means of custom program parameters that at least in part define operation of the presentation computer program;
    e) providing the COM object with a multimedia input from the multimedia presentation computer program; and
    f) causing the COM object to implement its interface methods on the multimedia input for providing the multimedia presentation computer program with the implemented presentation functions.

17. The method of claim 16 wherein the step of making the COM object accessible is accomplished by means of a globally unique identifier for the COM object; said COM object globally unique identifier made up of a sequence of numbers chosen large enough to generally avoid duplication with identifiers used to identify other custom programs.

18. The method of claim 17 wherein the multimedia presentation functions are implemented with two dynamically linked COM objects, one of said dynamically linked COM objects for performing a presentation function and a second dynamically linked COM object for implementing a user interface for use in defining the presentation function.

19. The method of claim 16 wherein the multimedia presentation functions are organized into families of multimedia effects.

20. The method of claim 19 wherein the COM object provides the multimedia presentation functions as one or more outputs to the multimedia presentation computer program, and the one or more outputs are graphic images that are transformations of at least one input image.

21. The method of claim 19 wherein the COM object provides the multimedia presentation functions as one or more outputs to the multimedia presentation computer program, and the one or more outputs are graphic images that are animations of an input graphic image.

22. The method of claim 19 wherein the multimedia computer program implements a persistence method to allow a state of the COM object to be saved and reloaded from a storage medium.

23. The method of claim 19 where the presentation function performed by the COM object can be undone by communicating with the multimedia presentation software.

* * * * *